United States Patent [19]

Reineck et al.

[11] Patent Number: 5,657,552
[45] Date of Patent: Aug. 19, 1997

[54] DEVICE FOR MEASURING DISTANCES ON GLOBES OR MAPS

[76] Inventors: Rollin Reineck, 1127 Lauloa St.; Jerome M. Comcowich, 1120 Lauloa St., both of Kailua, Hi. 96734

[21] Appl. No.: 555,584

[22] Filed: Nov. 9, 1995

[51] Int. Cl.$^6$ ............... G01B 7/02; G09B 27/08
[52] U.S. Cl. ............ 33/784; 434/141; 434/150; 324/629; 324/699; 338/68; 338/162; 338/190
[58] Field of Search ............ 33/1 G, 1 H, 706, 33/784; 324/629, 699, 714, 716; 338/68, 162, 190; 434/131, 150, 153, 141

[56] References Cited

U.S. PATENT DOCUMENTS

| | | |
|---|---|---|
| 1,207,868 | 12/1916 | Craighead . |
| 2,151,601 | 3/1939 | Johnson ........................ 434/141 |
| 2,408,651 | 10/1946 | Kiehl . |
| 2,886,892 | 5/1959 | Banfill . |
| 3,050,718 | 8/1962 | Giel ............................ 338/190 |
| 3,063,163 | 11/1962 | Dukes, Jr. . |
| 3,377,719 | 4/1968 | Kroitor . |
| 3,416,078 | 12/1968 | Boncuk et al. . |
| 3,973,326 | 8/1976 | Gallacher et al. . |
| 4,257,107 | 3/1981 | Heymsfield . |
| 4,451,874 | 5/1984 | Friedman . |
| 4,468,860 | 9/1984 | Rodengen . |
| 4,530,666 | 7/1985 | Triplett . |
| 4,941,267 | 7/1990 | Miller, Jr. ........................ 33/784 |

*Primary Examiner*—G. Bradley Bennett
*Attorney, Agent, or Firm*—Tom Hamill

[57] ABSTRACT

A map or globe is provided with a transparent thin covering capable of conducting electricity. The transparent thin covering envelopes the globe or overlies the map. An electrical resistance measuring means would be employed to determine a measure of electrical resistance between any two points on the map or globe. The electrical resistance measuring means would include a first probe and a second probe. The first probe would be placed on a first location on the map or globe and the second probe would be placed on a second location on the map or globe. A measure of electrical resistance will be generated by the electrical resistance measuring means reflecting the resistance of the conductive thin covering between the first location and the second location. This electrical resistance is proportionally related to the distance separating the two points on the map or globe. The measured resistance may then be processed by processing means to permit an accurate measurement of the distance between the two points to be output in a digital fashion. This numerical digital output may be in any conventional distance scale which would be related directly to the scale of the map or globe employed.

16 Claims, 6 Drawing Sheets

DEVICE FOR MEASURING DISTANCES ON GLOBES OR MAPS

BACKGROUND OF THE INVENTION

1. Field of the Invention

The present invention relates generally to distance measuring devices, and more particularly, to distance measuring devices for ascertaining the approximate great circle distances on a globe or certain map projections and directly displaying that distance. The present invention also relates to the measurement of electrical resistance in materials, especially thin, transparent, electrically conductive materials. The aforementioned map projections would have a minimum inherent distortion, where the distance scale is constant, and where a straight line as drawn on such a projection is equal to or approximates the great circle distance. Such map projections include, but are not limited to, Lambert Azmithul Equal Area Projections, Delesli Conic Equidistant Projections, Polar Azimuthal Projections, Lambert Conformal Conic Projections, Polyconic Projections and Oblique Cylindrical Projections. For purposes of this patent, the terms map and chart may be used interchangeably.

2. Description of the Prior Art

Devices which measure straight line distances on maps, or great circle distances on globes are known in the art. One of the most simple methods employed is the string method. A first end of a string is placed on a first point on the map or globe and a second end of the string is brought to a second point on the map or globe. The length of the string intermediate the two points is measured and this distance in compared to the scale present on the map or globe. A ruler may be effective for measuring straight line distances on a flat map; however, the ruler is defective in measuring the straight line distances on a spherical projection such as a globe, due to the inherent curvature of the globe.

Several other devices employ other methods for determining the distance between two points. U.S. Pat. No. 3,973,326 provides an example of a device for measuring distances where a movable wand is moved to a point whose distance from a datum point is to be determined. A resistor extends along the length of the wand and an electrical contact on the cursor makes point contact with a resistor. The contact and resistor form a potentiometer whose output varies with the position of the cursor. A digital voltmeter connected to the output of the potentiometer provides an indication of the distance measured. This device is employed in the analysis of seismic records. This device does not measure the electrical resistance in a thin transparent covering between two points, and also suffers from the deficiency where the device would be unable to measure distances on a spherical surface such as a globe.

Another device for electronically measuring distances is U.S. Pat. No. 4,941,267 which is employed to measure linear distance on scaled drawings. A rectangular device includes a side mounted stylus which is moved between a first and second point on the drawing. An electrical voltage signal is generated, which is then converted to frequency. A first and second binary count is generated by the circuit therein and an output of feet and inches is generated. This device does not measure the electrical resistance in a thin transparent covering between two points, and also suffers from the deficiency where the device would be unable to measure distances on a spherical surface such as a globe.

Thus, while the foregoing body of prior art indicates it to be well known to use electrical devices to measure distances on flat surfaces which employ voltage signals, the concept of covering the flat surface with a thin, transparent, electrically conductive material, and measuring the electrical resistance between two points located thereon, has not been shown. No prior art discloses the processing of a electrical resistance measurement to an output representative of the distance between the two above mentioned points as well. Nor has the concept of covering a spherical object, such as a globe, with a thin, transparent, electrically conductive material been shown, and measuring the electrical resistance between two points located thereon, also has not been shown. The simple and cost effective device of the instant invention is not contemplated. Nor does the prior art described above teach or suggest a educational device which may be used by individuals studying distances between major cities, geographical sites of interest, or other geological features on a globe. Other advantages of the present invention over the prior art also will be rendered evident.

SUMMARY OF THE INVENTION

To achieve the foregoing and other advantages, the present invention, briefly described, provides a map or globe with a transparent thin covering capable of conducting electricity. The transparent thin covering envelopes the globe or overlies the map. The transparent thin covering would be applied evenly to a globe or map. The transparent material may be applied in liquid form by brush or spray, or by an extremely thin film that may be uniformly molded to the surface. As this material conducts electricity it would have an inherent electrical resistance. An electrical resistance measuring means would be employed to determine a measure of electrical resistance between any two points on the map or globe. The electrical resistance measuring means must be sensitive enough to measure small changes in electrical resistance. The electrical resistance measuring means would include a first probe and a second probe. The first probe would be placed on a first location on the map or globe and the second probe would be placed on a second location on the map or globe. A measure of electrical resistance will be generated by the electrical resistance measuring means reflecting the resistance of the conductive thin covering between the first location and the second location. This electrical resistance is proportionally related to the distance separating the two points on the map or globe. The measured resistance may then be processed by processing means to permit an accurate measurement of the distance between the two points to be output in a digital fashion. This numerical digital output may be in any conventional distance scale which would be related directly to the scale of the map or globe employed. The output may be in miles, feet, inches, kilometers, meters or centimeters, or in any other known distance measuring systems. A measuring system selection means would permit the selection of alternative measuring systems, such as english standard or metric. A scale selection means would permit the user to adjust the distance measuring device to the scale present on any map or globe. Calibration means may also be present. Statistical methods may be employed to output an error figure, for example 100 miles (+/−) 1 mile.

The apparatus and method of the instant invention may be utilized as an educational device as used by individuals studying distances between major cities, geographical sites of interest, or other geological features on a terrestrial globe. Also, due to the advent of solar system and planetary astronomy, the instant device may be utilized on other globes representative of planets. Other uses include measuring distances over any three dimensional object, such as a three dimensional representation of a geologic feature, such as a mountain. In an embodiment of this nature, a model of the mountain would be made and covered with the thin, transparent, electrically conductive layer. This would permit a user to show distances that would be traversed by a climber making an ascent. The apparatus and method may be employed on two dimensional maps as well, and may include blueprints for design, or any other two dimensional representation which is to scale and has no inherent distortion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention to provide a distance measuring device which includes a thin, transparent, electrically conductive material, which overlies a scaled map or globe, and an electrical resistance measuring means which produces a signal which may be modified to express the distance between any two points on the map or globe.

It is another object of the present invention to provide a distance measuring device which may be easily and efficiently manufactured and marketed.

It is a further objective of the present invention to provide a distance measuring device which is of durable and reliable construction.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved distance measuring device embodying the principles and concepts of the present invention will be described.

Figure 1:
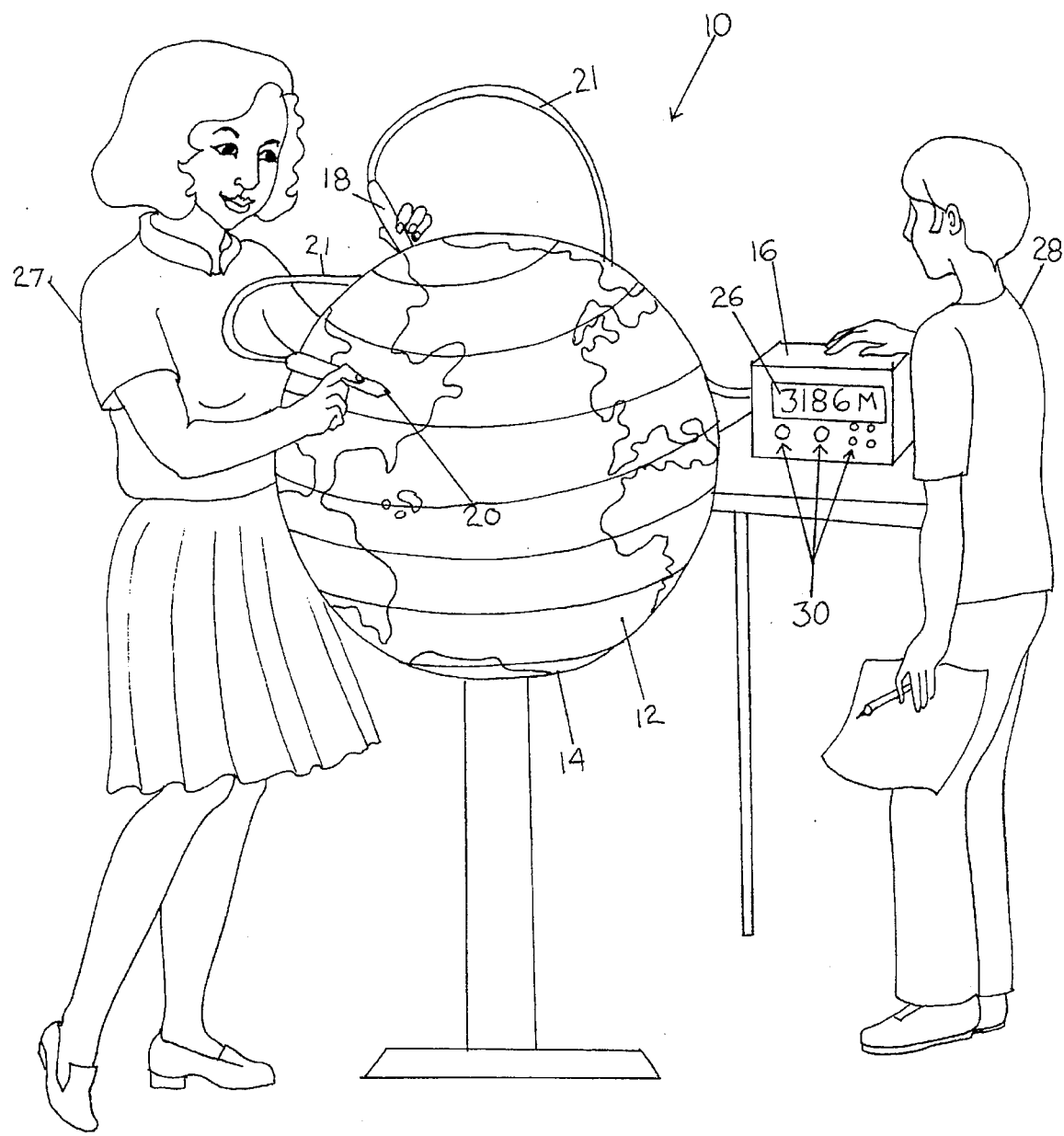
FIG. 1 is an environmental view showing the preferred embodiment of the distance measuring device of the invention.
Figure 2:
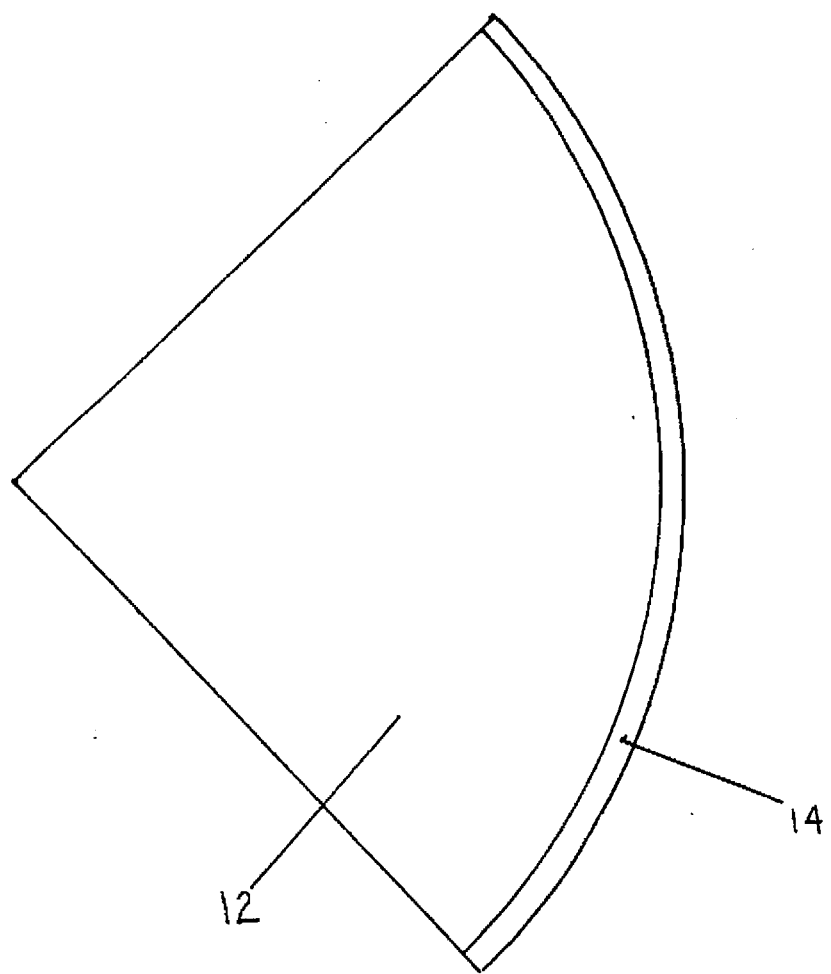
FIG. 2 is a cross-sectional view of the globe showing the thin, transparent, electrically conductive layer of the distance measuring device.
Figure 3:
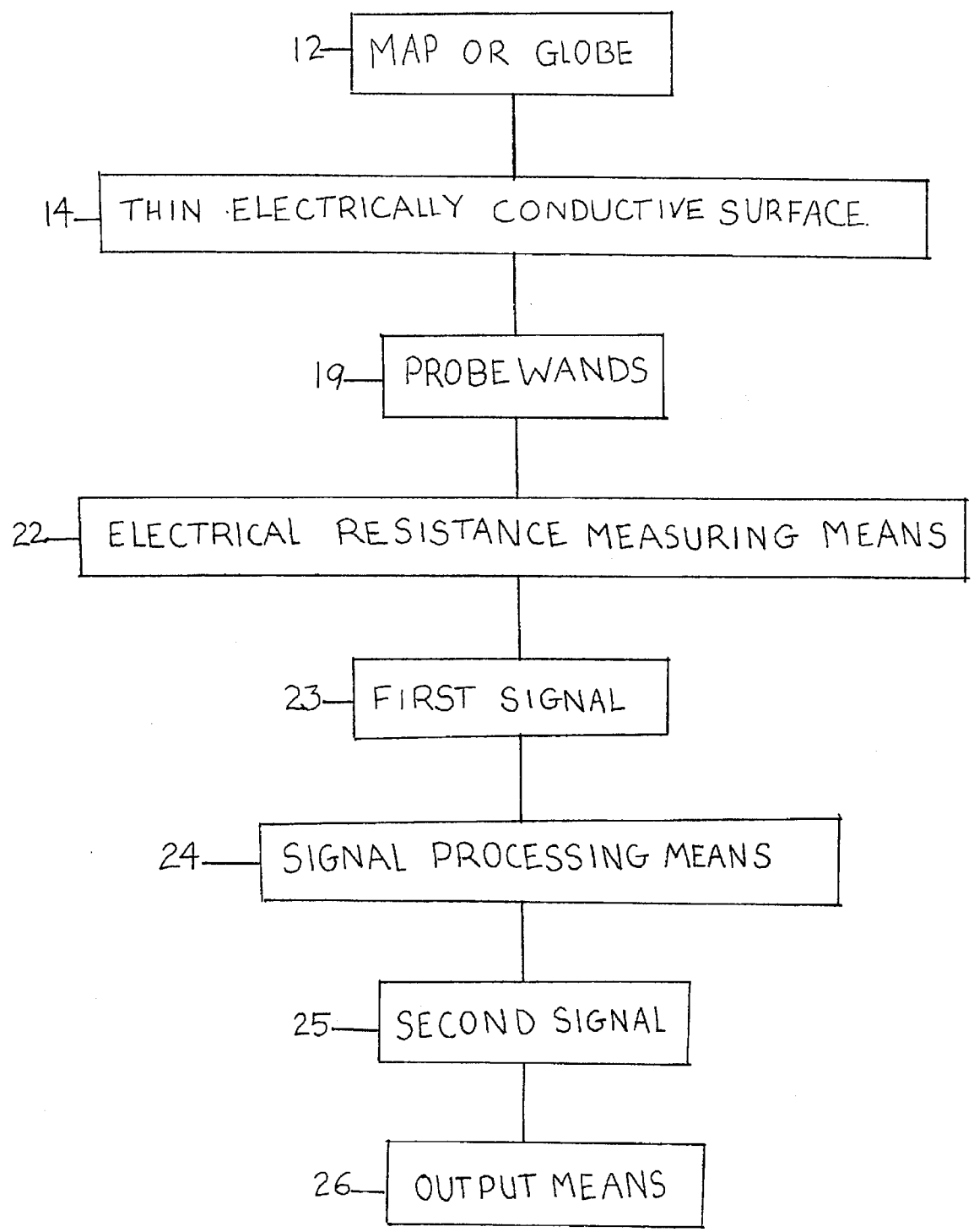
FIG. 3 is a block diagram showing the various components of the distance measuring device.

Turning initially to FIGS. 1-3, a first exemplary embodiment of the distance measuring device of the invention is generally designated by reference numeral 10. In its preferred form, the distance measuring device 10 comprises generally a globe 12 covered completely by a thin, transparent, electrically conductive covering 14, and the distance measuring apparatus 16. The distance measuring apparatus 16 includes a first probe wand 18 and a second probe wand 20. The first probe wand 18 and second probe wand 20 are referred to by reference numeral 19 in FIG. 3. The first probe wand 18 and the second probe wand 20 are connected to the distance measuring apparatus 16 by wires 21. The first probe wand 18 is placed on a first location on the globe 12 and the second probe wand 20 is placed on a second location on the globe 12. The first probe wand 18 and second probe wand 20 come in contact with the transparent, electrically conductive covering 14. The distance measuring apparatus includes an electrical resistance measuring means 22 which permits a first signal 23 to be generated representative of the amount of electrical resistance present in the transparent, electrically conductive covering 14 intermediate the first location and the second location. The first signal 23 is processed by a signal processing means 24 which generates a second signal 25 which represents the distance intermediate the first location and the second location. This distance will be modified to the scale of the map, therefore the output would be in miles or kilometers etc. This second signal 25 is output on the output means 26 on the face of the distance measuring apparatus 16. A first student 27 is shown holding the first probe wand 18 and second probe wand 20, and a second student 28 is shown looking at the output means 26 displaying a distance of 3186 miles.

The probe wands 19 may be of any conventional design, they include an electrically conductive tip connected to an insulated portion for holding the probe wands 19. The electrically conductive tip is in communication with wires 21. The wires 21 are also connected to the electrical resistance measuring means 22. This may be an ohmmeter or any other means to measure electrical resistance. The electrical resistance measuring means 22 measures the electrical resistance present in the thin, electrically conductive surface 14 between the first location and second location. This value is output from the electrical resistance measuring means as a first signal 23. This first signal 23 is then processed by the signal processing means 24. Signal processing means 24 may be a circuit, microprocessor or any other appropriate means to modify the first signal 23. The signal processing means 24 may include calibration means. The calibration means will permit the user to calibrate the first signal, the calibration will permit the first signal to be accurate with respect to the material and physical properties of the thin, transparent, electrically conductive layer, such as the specific resistance per unit length, specific thickness of the layer, etc. The signal processing means may also include means to vary the processing depending on the scale present on the map or globe. Signal processing means 24 converts the first signal 23 to a second signal 25. Second signal 25 may be output in a digital numeric fashion on the output means 26. This output may be indicative of the specific unmodified distance between the first probe wand and the second probe wand, or may be modified to express the scaled distance reflected on the two points located on the globe, expressed in miles, feet, inches, kilometers, meters, centimeters, or any other known measuring units. The measuring system employed will be dictated by a measuring system selection. The measuring system selection means may be included in the signal processing means 24. This would permit the user to select the use of English or Metric measuring systems. A scale selection means may also be included in the signal processing means 24. The scale selection means permits the user to adjust the distance measuring device to the scale present on any map or globe employed. This would permit the user to select an appropriate scale for the map or globe employed. For example, one setting may be 1 inch is equivalent to 100 miles, or 1 cm is equivalent to 100 km. The scale selection means modifies the second signal to a third signal which is indicative of the distance between the first location and the second location based on the specific scale which is employed on the map or globe. The calibration means, measuring system selection means and scale selection means may be activated and changed through the adjustment of switches or dials 30 and would be located proximal to the output means 26.

Figure 4:
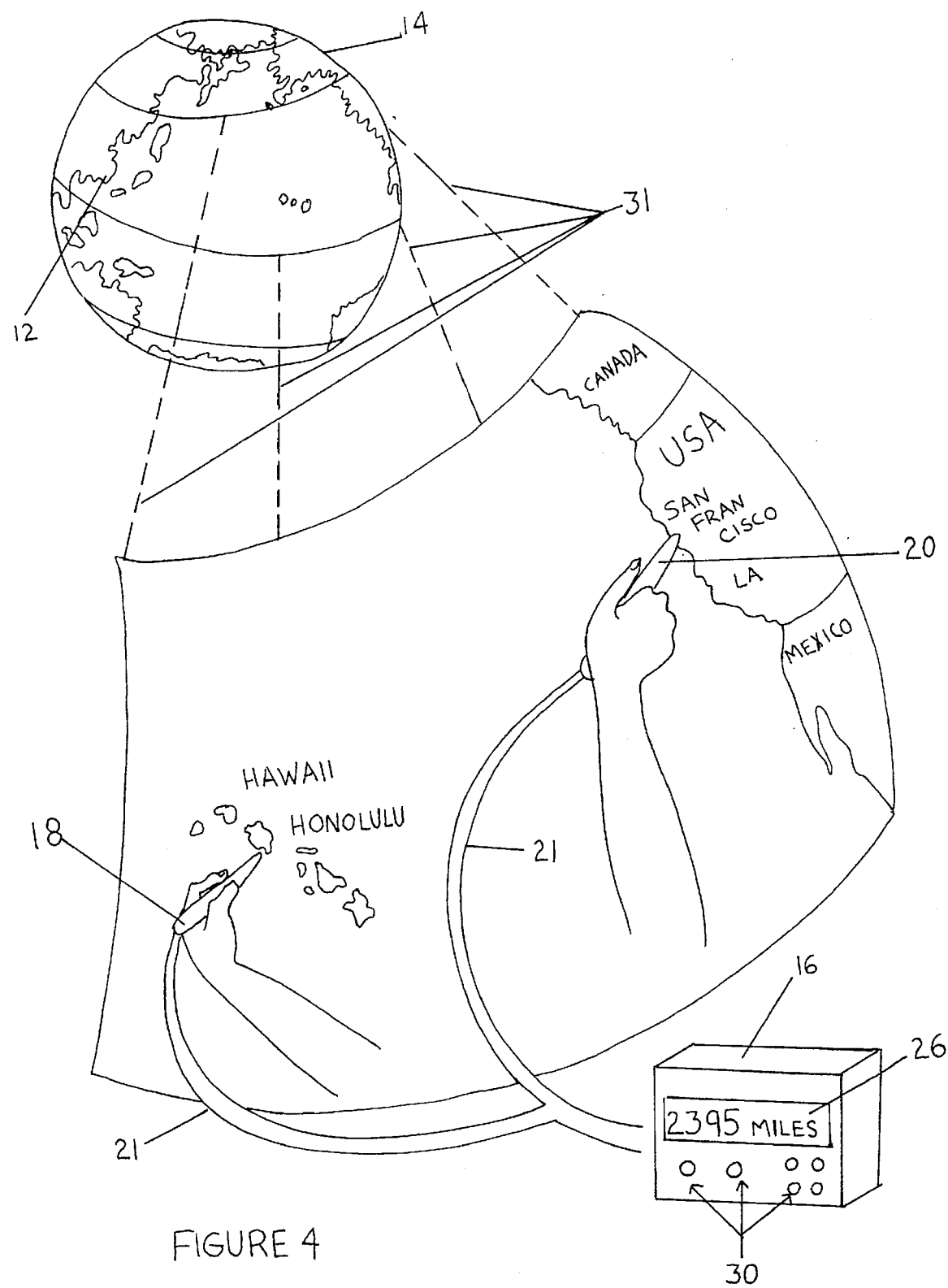
FIG. 4 is an expanded view of a portion of the globe showing the distance measuring device in use.

Referring now specifically to FIG. 4, a spherical globe 12 is shown encased with the thin, transparent, electrically conductive material 14. A section of the globe 14 is detached by dashed lines 31. This globe section shows the Hawaiian Islands and a portion of the west coast of the Americas. The distance measuring apparatus 16 is shown with the first probe wand 18 and the second probe wand 20. The first probe wand 18 is placed in contact with the thin, transparent, electrically conductive material 14 immediately above the representation of the city of Honolulu, Hi. The second probe wand 20 is placed in contact with the thin, transparent, electrically conductive material 14, above the representation of the city of San Francisco, Calif. The switches and dials 30 will be set to reflect the scale present on the globe, whether the output should be in miles or kilometers, and any appropriate calibration. Statistical techniques may also be employed to give a readout of the measurement error. Output means 26 displays a value of 2395 miles which is the great circle mileage between the two cities. This value may also be expressed in kilometers. The specific manner the distance is transduced is best shown by FIG. 3.

Figure 5:
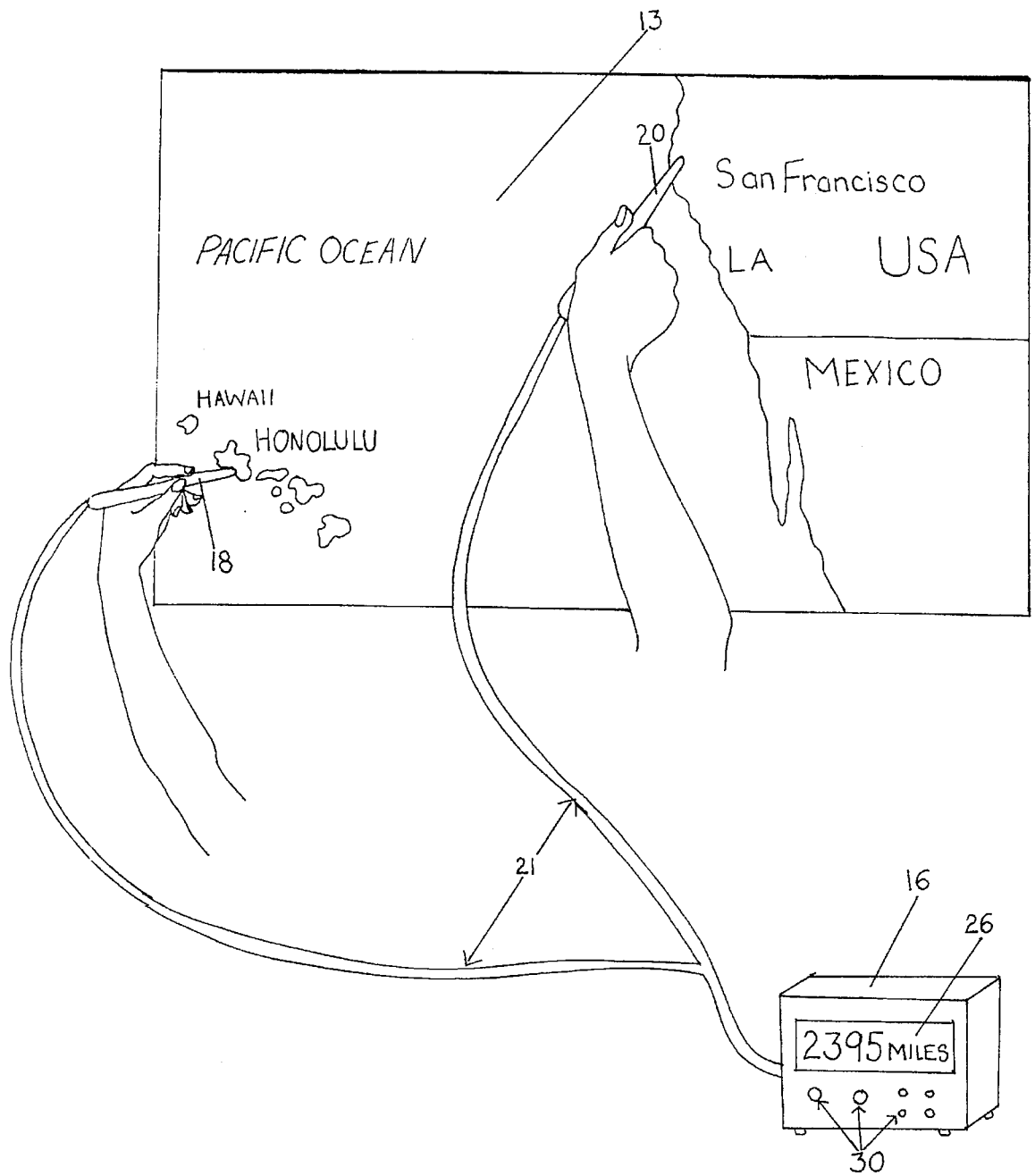
FIG. 5 is a perspective view of a flat map or chart utilizing the instant invention.
Figure 6:
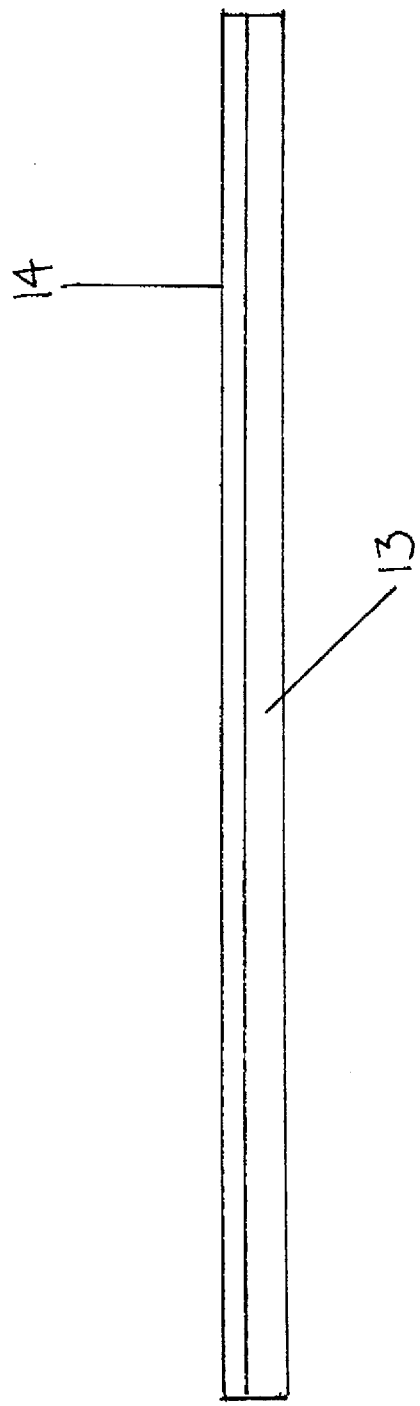
FIG. 6 is a cross-sectional view of the flat map showing the thin, transparent, electrically conductive layer of the distance measuring device.

Referring now specifically to FIGS. 5 and 6, a map 13 is shown encased with the thin, transparent, electrically conductive material 14. This map is two dimensional and shows the Hawaiian Islands and a portion of the west coast of the Americas. The distance measuring apparatus 16 is shown with the first probe wand 18 and the second probe wand 20. The first probe wand 18 is placed in contact with the thin, transparent, electrically conductive material 14 immediately above the representation of the city of Honolulu, Hi. The second probe wand 20 is placed in contact with the thin, transparent, electrically conductive material 14, above the representation of the city of San Francisco, Calif. The switches and dials 30 will be set to reflect the scale present on the map, whether the output should be in miles or kilometers, and any appropriate calibration. Statistical techniques may also be employed to give a readout of the measurement error. Output means 26 displays a value of 2395 miles which closely approximates the great circle mileage between the two cities. The specific manner the distance between the first location and the second location is transduced is best shown by FIG. 3. It is to be appreciated that this map 13 may be a blueprint or any two dimensional drawing which is to a specific scale. FIG. 6 shows a side view with the map 13 lying below the thin, transparent, electrically conductive material 14.

It is to be understood that the map 13 may be any flat object which has a graphical representation, including blueprints, charts (air or sea), architectural drawings or other representations. Any flat representation which includes a scale or is to a 1 to 1 scale may be employed as long as the distance scale is constant throughout the drawing and there is no inherent distortion.

It is apparent from the above that the present invention accomplishes all of the objectives set forth by providing a new and improved distance measuring device which includes a thin, transparent, electrically conductive material, which overlies a scaled map or globe, and an electrical resistance measuring means which produces a signal which may be modified to express the distance between any two points on the map or globe.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

We claim:

1. A distance measuring device including:
    a globe, said globe having a spherical surface area,
    a thin, transparent, electrically conductive layer, said thin, transparent electrically conductive layer uniformly covering said spherical surface area,
    an electrical resistance measuring means, said electrical resistance measuring means including a first probe and a second probe, said electrical resistance measuring means producing a first signal, said first signal being generated by placing said first probe on a first location on said thin, transparent electrically conductive layer and by placing said second probe on a second location on said thin, electrically conductive layer, said first signal being representative of the electrical resistance in said thin, transparent, electrically conductive layer intermediate said first location and said second location, a signal processing means, said signal processing means modifying said first signal into a second signal, said second signal being representative of the distance between said first location and said second location, whereby said second signal is displayed on a display means as an output representative of the distance between said first location and said second location.

2. The distance measuring device as claimed in claim 1 wherein said globe includes a scale, and said signal processing means includes a selection means, said selection means further modifying said second signal to a third signal, said third signal to be displayed as a second output, said second output representative of the scale distance between said first location and said second location.

3. The distance measuring device as claimed in claim 2 wherein including a measurement system selection means, said measurement system selection means permitting the scale distance to be expressed in metric distance measurement units or english distance measurement units.

4. The distance measuring device as claimed in claim 3 wherein said electrical resistance means is a ohmmeter.

5. The distance measuring device as claimed in claim 4 wherein said display means includes a digital display.

6. The distance measuring device as claimed in claim 5 wherein said signal processing means includes a circuit.

7. The distance measuring device as claimed in claim 5 wherein said signal processing means includes a microprocessor.

8. A distance measuring device including:

a flat object, a thin, transparent, electrically conductive layer, said thin, transparent electrically conductive layer uniformly covering said object, an electrical resistance measuring means, said electrical resistance measuring means including a first probe and a second probe, said electrical resistance measuring means producing a first signal, said first signal being generated by placing said first probe on a first location on said thin, transparent electrically conductive layer and by placing said second probe on a second location on said thin, electrically conductive layer, said first signal being representative of the electrical resistance in said thin, transparent, electrically conductive layer intermediate said first location and said second location, a signal processing means, said signal processing means modifying said first signal into a second signal, said second signal being representative of the distance between said first location and said second location, whereby said second signal is displayed as an output representative of the distance between said first location and said second location.

9. The distance measuring device as claimed in claim 8 wherein said flat object is a graphic representation selected from the group consisting of a map, a blueprint, or an architectural drawing.

10. The distance measuring device as claimed in claim 8 wherein said flat object is a graphical representation that includes a scale, and said signal processing means includes a selection means, said selection means further modifying said second signal to a third signal, said third signal to be displayed, as a second output, said second output representative of the scale distance between said first location and said second location.

11. The distance measuring device as claimed in claim 10 wherein including a measurement system selection means, said measurement system selection means permitting the scale distance to be expressed in metric distance measurement units or english distance measurement units.

12. The distance measuring device as claimed in claim 11 wherein said electrical resistance means is a ohmmeter.

13. The distance measuring device as claimed in claim 12 wherein said display means includes a digital display.

14. The distance measuring device as claimed in claim 13 wherein said signal processing means includes a circuit.

15. The distance measuring device as claimed in claim 14 wherein said signal processing means includes a microprocessor.

16. The distance measuring device as claimed in claim 8 wherein said flat object is a graphic representation selected from the group consisting of certain types of map projections, blueprints or architectural drawings.

* * * * *